(12) United States Patent
Hemler, Jr.

(10) Patent No.: US 8,815,761 B2
(45) Date of Patent: Aug. 26, 2014

(54) CATALYST MIXING PROCESS AND REGENERATOR RELATING THERETO

(75) Inventor: Charles L. Hemler, Jr., Mt. Prospect, IL (US)

(73) Assignee: UOP LLC, Des Plaines, IL (US)

( * ) Notice: Subject to any disclaimer, the term of this patent is extended or adjusted under 35 U.S.C. 154(b) by 225 days.

(21) Appl. No.: 13/475,104

(22) Filed: May 18, 2012

(65) Prior Publication Data

US 2013/0310244 A1     Nov. 21, 2013

(51) Int. Cl.
    *B01J 38/12*     (2006.01)
(52) U.S. Cl.
    USPC .............................. 502/38; 502/20; 502/514
(58) Field of Classification Search
    USPC .............. 502/38, 34, 41, 45, 46, 514, 20
    See application file for complete search history.

(56) References Cited

U.S. PATENT DOCUMENTS

| | | | |
|---|---|---|---|
| 3,470,084 A | 9/1969 | Scott | |
| 3,893,812 A | 7/1975 | Conner et al. | |
| 3,904,548 A | 9/1975 | Fagan et al. | |
| 4,167,492 A | 9/1979 | Varady | |
| 4,331,533 A | 5/1982 | Dean et al. | |
| 4,332,674 A | 6/1982 | Dean et al. | |
| 4,336,160 A | 6/1982 | Dean et al. | |
| 4,592,762 A | 6/1986 | Babu et al. | |
| 4,615,992 A | 10/1986 | Murphy | |
| 5,409,872 A | 4/1995 | Raterman | |
| 6,786,716 B1 | 9/2004 | Gardner et al. | |

OTHER PUBLICATIONS

U.S. App. No. 13/323,053, filed Dec. 12, 2011, Lev Davydov et al.
U.S. Appl. No. 13/323,129, filed Dec. 12, 2011, Lev Davydov et al.
U.S. Appl. No. 13/323,217, filed Dec. 12, 2011, Lev Davydov et al.
U.S. Appl. No. 13/323,249, filed Dec. 12, 2011, Lev Davydov et al.

*Primary Examiner* — Edward Johnson

(74) *Attorney, Agent, or Firm* — James C Paschall

(57) ABSTRACT

One exemplary embodiment can be a process for mixing catalyst in a regenerator. The process can include providing a first stream of catalyst, a second stream of catalyst mixed with the first stream of catalyst, and an oxygen-containing gas to a chamber via a distributor of the regenerator. Generally, the chamber imparts a swirl to at least one of the oxygen-containing gas, the first catalyst, and the second catalyst for regenerating the catalyst.

15 Claims, 6 Drawing Sheets

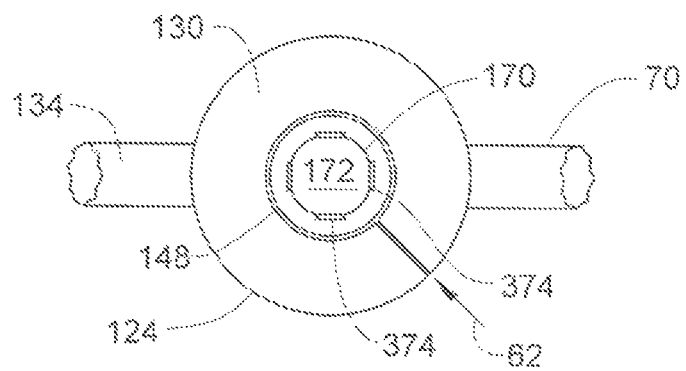
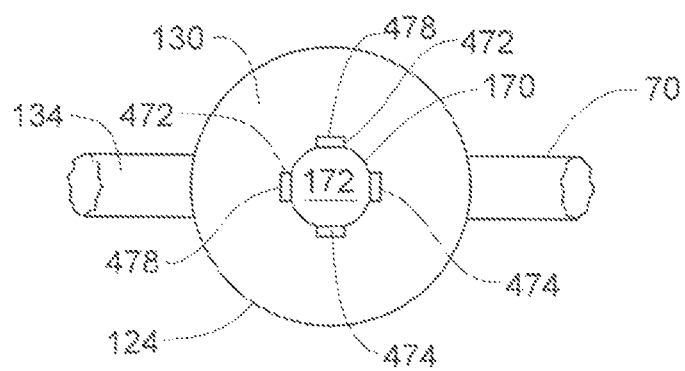
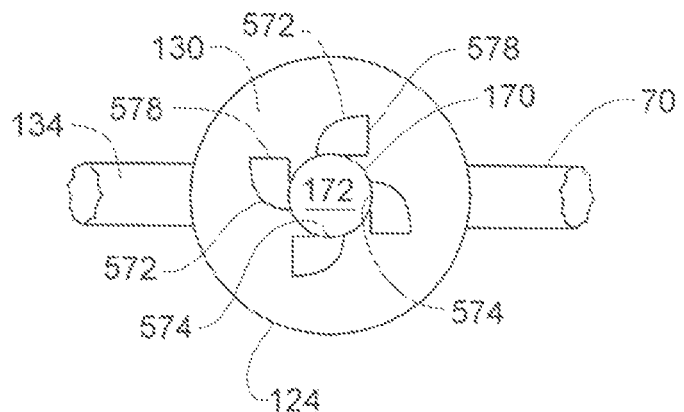

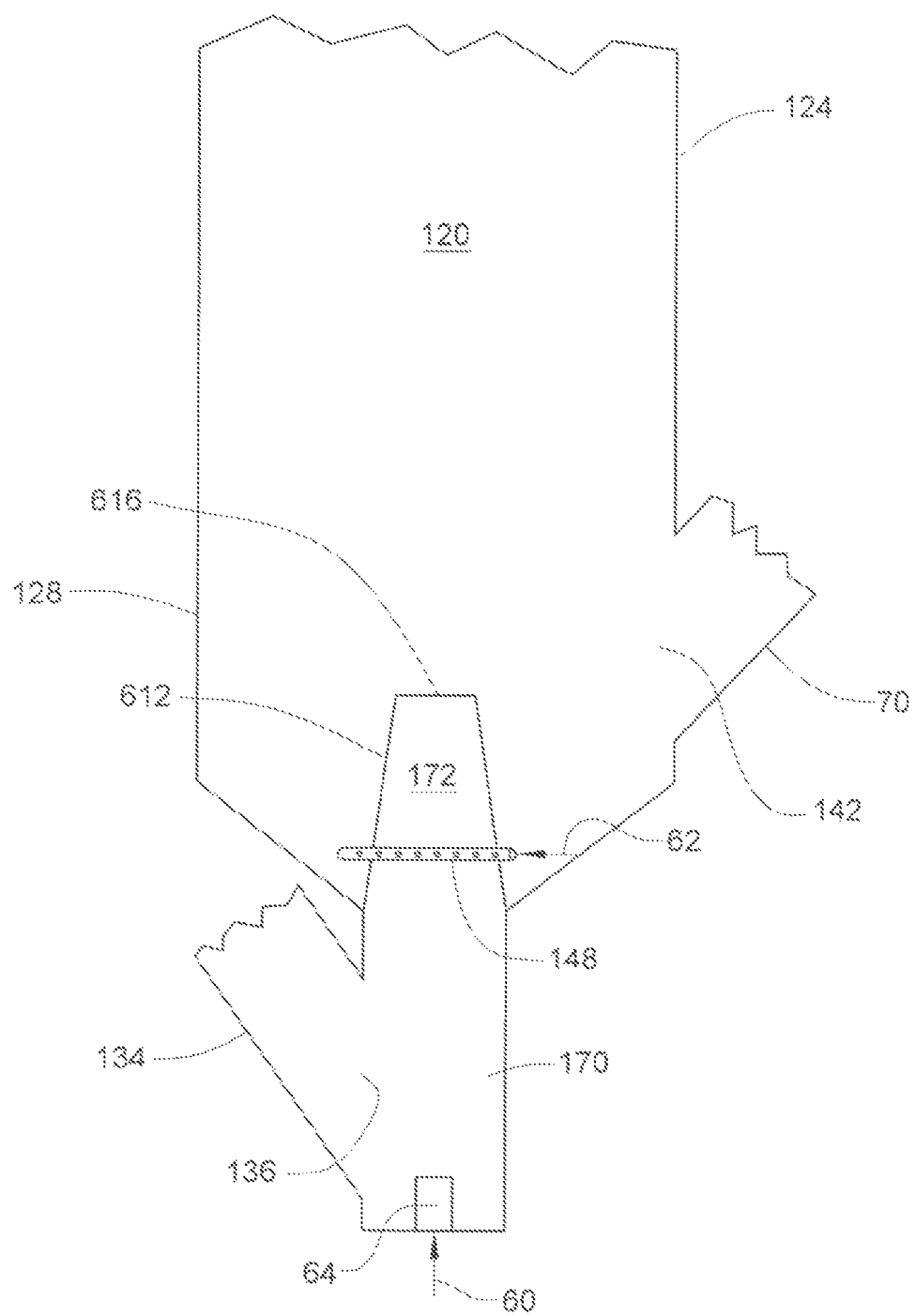

CATALYST MIXING PROCESS AND REGENERATOR RELATING THERETO

FIELD OF THE INVENTION

This invention generally relates to a catalyst mixing process, and a regenerator relating thereto.

DESCRIPTION OF THE RELATED ART

A fluid catalytic cracking hydrocarbon conversion process may be accomplished by contacting hydrocarbons in a fluidized reaction zone with a catalyst composed of finely divided particulate material. The reaction in catalytic cracking, as opposed to hydrocracking, can be carried out in the absence of substantially added hydrogen or the consumption of hydrogen. As the cracking reaction proceeds, substantial amounts of highly carbonaceous material, which may be referred to as coke, can be deposited on the catalyst to provide coked or carbonized catalyst. As such, this carbonized catalyst is often referred to as spent catalyst, although the carbonized catalyst may still have significant catalytic activity.

Generally, vaporous products are separated from carbonized catalyst in a reactor vessel. Usually, the carbonized catalyst is subjected to stripping with a gas, such as steam, to strip entrained hydrocarbonaceous gases from the carbonized catalyst. A high temperature regeneration with oxygen within a regeneration zone operation, can burn coke from the carbonized catalyst that may have been stripped.

In one regenerator configuration, regenerated and spent catalyst mix with air in external mixing combustors and pass up through a riser section before entering a regeneration vessel. Generally, the mixing of these catalysts is incomplete. In addition, as unit capacity increases, pressure drop through such a riser often becomes a limiting consideration and increased catalyst attrition can result.

Therefore, an improved apparatus and process may be sought in the mixing of spent and regenerated catalyst.

SUMMARY OF THE INVENTION

One exemplary embodiment can be a process for mixing catalyst in a regenerator. The process can include providing a first stream of catalyst, a second stream of catalyst mixed with the first stream of catalyst, and an oxygen-containing gas to a chamber via a distributor of the regenerator. Generally, the chamber imparts a swirl to at least one of the oxygen-containing gas, the first catalyst, and the second catalyst for regenerating the catalyst.

Another exemplary embodiment may be a regenerator for regenerating catalyst. The regenerator can include a base, a gas distributor proximate to a bottom of the base, and a chamber positioned over the gas distributor and spaced apart from the at least one wall. Often, the base includes at least one wall, a first conduit for transporting catalyst, and a second conduit for transporting catalyst. Usually, the chamber forms at least one outlet and terminates in a cap for imparting a swirl to a gas rising therefrom.

Yet another exemplary embodiment can be a process for mixing catalyst in a regenerator. The process may include providing at least one wall and a chamber spaced apart from the at least one wall, a first stream of catalyst into the chamber, a second stream of catalyst outside the chamber downstream of the first stream, and an oxygen-containing gas to the chamber via a distributor.

The embodiments provided herein can include a chamber imparting a swirl to at least one of an oxygen-containing gas, a first catalyst, and a second catalyst for a regenerator. The swirling gases and/or catalyst may enhance mixing of and contact with a catalyst and lessen the pressure drop.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. A stream may also include solid(s), e.g., catalyst, and optionally fluid(s), such as air or steam, in addition to or other than hydrocarbons.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "vapor" can mean a gas or a dispersion that may include or consist of one or more hydrocarbons.

As used herein, the term "fluid catalytic cracking" may be abbreviated "FCC".

As used herein, the term "kilopascal" may be abbreviated "KPa" and all pressures disclosed herein are absolute; the term "meter" may be abbreviated "m"; the term "kilogram" may be abbreviated "kg"; and the term "second" may be abbreviated "s".

As used herein, the term "communication" can mean that material, such as fluid(s) and/or solid(s), flow is operatively permitted between components.

As used herein, the term "downstream communication" can mean that at least a portion of material flowing to the subject in downstream communication may operatively flow from the object with which the subject communicates.

As used herein, the term "upstream communication" can mean that at least a portion of the material flowing from the subject in upstream communication may operatively flow to the object with which the subject communicates.

As used herein, the term "direct communication" can mean that flow from the upstream component may enter the downstream component without passing through an intermediate vessel.

The term "providing" can mean passing material, such as a stream, from a conduit or vessel often directly or indirectly to an object, such as a vessel.

As depicted, process flow lines in the figures can be referred to interchangeably as, e.g., lines, pipes, standpipes, feeds, products, or streams.

BRIEF DESCRIPTION OF THE DRAWINGS

FIGS. 3a, 3b and 3c are sectional views of FIG. 2 taken at segment 3-3.

FIG. 4 is a partial, schematic, elevational view of the exemplary regenerator of FIG. 2 incorporating an alternative embodiment.

DETAILED DESCRIPTION

Figure 1:
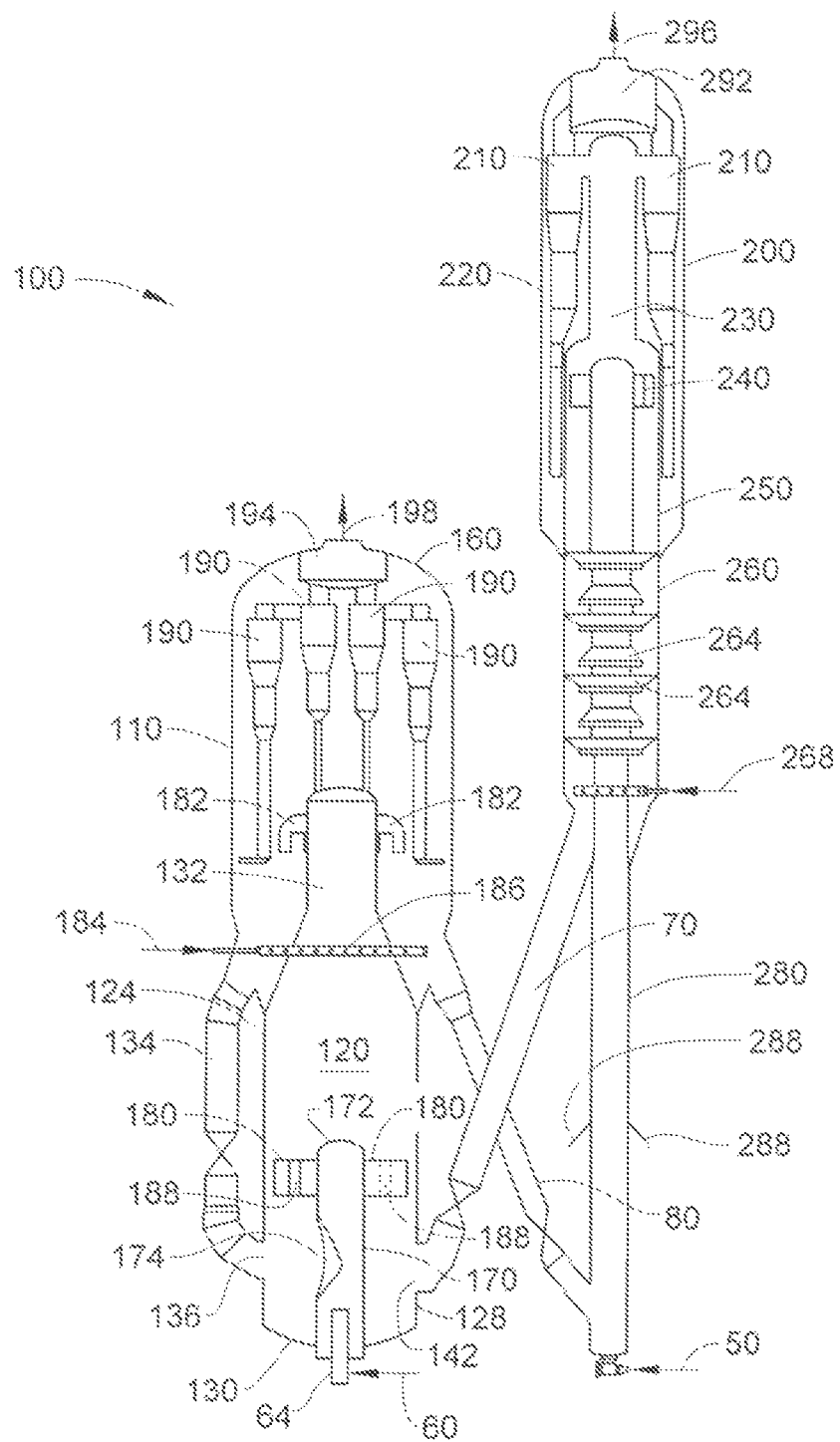
FIG. 1 is a schematic, elevational view of an exemplary FCC apparatus.

Referring to FIG. 1, the embodiments disclosed herein are generally for mixing regenerated catalyst and spent catalyst for contact with an oxygen-containing gas. The regenerated catalyst may also be referred to as recycled catalyst, as the catalyst may be transferred from a second zone to a first zone in a regenerator, as discussed further below.

The embodiments may be useful in any solids-gas contacting equipment. However, ready usefulness may be found in an FCC apparatus 100, which can include a regenerator 110 and a riser-reactor 200. A regenerator standpipe 80 can transfer a regenerated catalyst stream from the regenerator 110 at a rate regulated by a control valve to the riser-reactor 200, which can include a reaction vessel 220, a separation chamber 250, a stripping zone 260, and a riser 280. Usually, the riser 280 is an elongated vertical tube typically made of carbon steel. The regenerator standpipe 80 may connect to the lower section. The inner surface of the entire riser 280 may be coated with a refractory material.

A fluidization gas 50, such as steam, from a nozzle and a ring in the lower section may urge catalyst upward through the riser 280 at a relatively high density. A plurality of feed distributors 288 in the upper section of the riser 280 can inject a hydrocarbon feed across the flowing stream of catalyst particles. Upon contacting the hydrocarbon feed with catalyst in the riser 280, the heavier hydrocarbon feed cracks to produce lighter gaseous hydrocarbon product while coke is deposited on the catalyst particles to produce carbonized or spent catalyst.

Higher boiling hydrocarbons are suitable as the hydrocarbon feed, and may include a vacuum gas oil. A vacuum gas oil typically has a boiling range of about 340-about 560° C. and includes one or more C22-C45 hydrocarbons. Often, the vacuum gas oil is prepared by vacuum fractionation of an atmospheric residue. Higher boiling hydrocarbons may include heavy bottoms from crude oil, heavy bitumen crude oil, shale oil, tar sand extract, deasphalted residue, products from coal liquefaction, atmospheric and vacuum reduced crudes, and mixtures thereof. A lighter recycle or a previously cracked feed, such as naphtha, may be suitable as a feed component.

The reaction vessel 220 is in downstream communication with the riser 280. In the reactor vessel 220, the carbonized catalyst and the gaseous product are separated. A pair of disengaging arms 240 may tangentially and horizontally discharge the mixture of gas and catalyst from a top of the riser 280 through one or more outlet ports formed in the disengaging arms 240 into a separation chamber 250 to effect partial separation of gases from the catalyst. Two, three or four disengaging arms 240 may be used depending on the size of the FCC apparatus 100.

A conduit 230 carries hydrocarbon vapors, including stripped hydrocarbons, stripping media and entrained catalyst, to one or more cyclones 210 in the reaction vessel 220 that may separate carbonized catalyst from the hydrocarbon gaseous stream. A collection plenum 292 in the reaction vessel 220 may gather the separated hydrocarbon gaseous streams from the cyclones 210 for passage from the reaction vessel 220 as a product stream 296 and eventually into a fractionation recovery zone, as disclosed in, e.g., U.S. Pat. No. 3,470,084.

Diplegs discharge catalyst from the cyclones 210 into a lower bed in the reaction vessel 220. The catalyst with adsorbed or entrained hydrocarbons may eventually pass from the lower bed into an optional stripping zone 260 across ports defined in a wall of the reaction vessel 220. Catalyst separated in the separation vessel 220 may pass directly into the optional stripping zone 260 via a bed. A line 268 may deliver inert fluidization gas, typically steam, to the stripping zone 260 through a fluidizing distributor. The stripping zone 260 may contain baffles 264 (two of which are numbered) or other equipment to promote contacting between a stripping gas and the catalyst. The stripped carbonized catalyst leaves the stripping zone 260 of the reaction vessel 220 of the riser-reactor 200 with a lower concentration of entrained or adsorbed hydrocarbons as compared to first entry or if untreated. Usually, the carbonized catalyst leaves the reaction vessel 220 of the riser-reactor 200 through a spent catalyst conduit 70 and feeds into the regenerator 110 at a rate regulated by a control valve.

The riser 280 can be maintained at high temperature conditions such as a temperature above about 425° C. In one exemplary embodiment, the cracking conditions may include a temperature of about 480-about 630° C. at the riser outlet port and a pressure of about 160-about 620 kPa, but typically less than about 380 kPa. The catalyst:oil ratio, based on the weight of catalyst and feed hydrocarbons entering the bottom of the riser, may range up to about 30:1, but is typically about 4:1-about 10:1, and may range from about 7:1-about 25:1. Hydrogen is not normally added to the riser 280, although hydrogen addition may be provided. Steam may be passed into the riser 280 and reaction vessel 220 equivalent to about 2-about 35%, by weight, of feed. Typically, however, the steam rate can be about 2-about 7%, by weight, for maximum gasoline production and about 10-about 20%, by weight, for maximum light alkene production. The average residence time of catalyst in the riser may be less than about 5 seconds.

The type of catalyst employed in the process may be chosen from a variety of commercially available catalysts. A catalyst including a zeolitic material such as Y Zeolite is preferred, but the older style amorphous catalysts can be used if desired. Additionally, shape-selective additives such as ZSM-5 may be included in the catalyst composition to increase light alkene production.

Usually, the regenerator 110 is in downstream communication with the reaction vessel 220. In the regenerator 110, coke may be combusted from the portion of carbonized catalyst delivered to the regenerator 110 by contact with an oxygen-containing gas such as air to provide a regenerated catalyst. The regenerator 110 may be a combustor type of regenerator, which may use hybrid turbulent bed-fast fluidized conditions for completely regenerating carbonized catalyst. However, other regenerator vessels and other flow conditions may be suitable. The regenerator 110 may include a first zone 120 and a second zone 160.

Typically, the spent catalyst conduit 70 feeds carbonized catalyst to a first zone 120 defined by at least one wall 124 through a spent catalyst inlet chute. The carbonized catalyst from the reaction vessel 220 usually contains carbon in an amount of about 0.2-about 2%, by weight, which can be present in the form of coke. Although coke may be primarily composed of carbon, it may contain from about 3-about 12%, by weight, hydrogen as well as sulfur and other materials. The fluidization gas stream, such as an oxygen-containing stream 60, typically air, may enter the first zone 120 of the regenerator 110 through a distributor 64. As the oxygen-containing stream 60 typically enters the first zone 120, the oxygen-containing gas may contact a carbonized catalyst entering from the spent catalyst conduit 70 and can lift the catalyst at a superficial velocity of combustion gas in the first zone 120 of perhaps at least about 1.1 m/s. In one embodiment, the first zone 120 may have a catalyst density of about 40-about 320 kg/m$^3$, and a superficial gas velocity of about 1.1-about 6.1 m/s. The oxygen in the combustion gas may contact the carbonized catalyst and combust carbonaceous deposits from the catalyst to at least partially regenerate the catalyst and generate flue gas.

In one exemplary embodiment, to accelerate combustion of the coke in the first zone 120, hot regenerated catalyst from a dense catalyst bed above in the second zone 160 may be recirculated into the first zone 120 via a catalyst recycle conduit 134, typically external to the first zone 120, regulated by a control valve. Hot regenerated catalyst may enter the first zone 120 through an inlet. Recirculation of the regenerated catalyst, by mixing hot catalyst from the dense catalyst bed with relatively cooler carbonized catalyst from the spent catalyst conduit 70 entering the first zone 120, can raise the overall temperature of the catalyst and gas mixture in the first zone 120.

The regenerated catalyst in the catalyst recycle conduit 134 can provide a first stream 136 of catalyst and the spent catalyst in the spent catalyst conduit 70 can provide a second stream 142 of catalyst. The regenerator 110 can at least partially enclose a chamber 170 having a closed top or a cap 172 that may form a hemispherical head. In one aspect, the chamber 170 may be substantially cylindrical. Typically, the chamber 170 is disposed in the first zone 120 proximate to a base 128 forming a bottom 130. This cap 172 may prevent catalyst from exiting upwardly through the top of the chamber 170 in alignment with the riser section 132. At least one, and preferably the plurality of openings in the chamber 170 can be spaced at the ends of one or more swirl arms 180. The chamber 170 can form an opening 174 for receiving catalyst.

Generally, the chamber 170 is made of stainless steel such as 300 Series stainless steel and be lined with refractory. The edges of the openings in the swirl arms 180 may have a construction that prevents erosion. For example, the edges may be thicker than the rest of the structure. The edges may also be curved to deflect potentially eroding catalyst particles. Moreover, a weld bead may be welded at the edges to also resist erosion. Additionally, the chamber 170 may be made of or coated with a ceramic or other material that resists erosion.

The chamber 170 may communicate with the catalyst recycle conduit 134 and the spent catalyst conduit 70. The chamber 170 can be spaced apart from at least one wall 124 of the regenerator 110. The catalyst recycle conduit 134 and the spent catalyst conduit 70 may communicate with the base 128 of the regenerator 110, so the catalyst recycle conduit 134 may feed the first stream 136 of recycled, regenerated catalyst and the spent catalyst conduit 70 may feed the second stream 142 of spent catalyst to the base 128.

The opening 174 formed in the chamber 170 may serve as an entrance to and an exit from an interior of the chamber 170. The opening 174 may be in alignment with the catalyst recycle conduit 134 for providing the first stream 136 of catalyst to the opening 174. However, catalyst from the first and second catalyst streams 136 and 142 may directly or indirectly enter the opening 174. Alternatively, the opening 174 can be in alignment with the spent catalyst conduit 70 for providing the second stream 142 of catalyst to the opening 174.

The first stream 136 of regenerated catalyst and the second stream 142 of catalyst may pass from the chamber 170 back into the first zone 120. By virtue of the first and second catalyst streams 136 and 142 entering into and exiting the chamber 170 through the opening 174, the catalyst streams 136 and 142 can mix together to provide a mixed stream of catalyst with a more homogeneous temperature throughout the mixed stream of catalyst.

The chamber 170 may have at least one additional exit opening formed at one or more ends of one or more tubular swirl arms 180. The swirl arms 180 can impart a whirl or swirl to the exiting oxygen-containing gas, and optionally catalyst. The swirl-imparting configuration may be an arcuate tube that has a rectangular cross section. Although two swirl arms 180 are depicted in FIG. 1, any suitable number of swirl arms may be utilized, such as four swirl arms. Typically, fluidization gas from a distributor 64 propels catalyst entering the chamber 170 upward to the exit through the swirl arms 180. As the mixed stream of catalyst passes from the chamber 170 into the swirl arms 180, the arcuate configuration imparts a swirling motion to the mixed catalyst stream. The swirl arms 180 corresponding exit openings 188, which in this exemplary embodiment can form respective rectangular slots on opposing sides of respective swirl arms 180, may be configured tangentially to generate a swirling motion while the mixed stream of catalyst and gases may pass from the chamber 170. Alternatively, the swirl arms 180 may form chutes at their respective ends for dispensing catalyst. The swirling motion can serve to increase mixing in the first zone 120.

The mixture of catalyst and combustion gas in the first zone 120 may ascend through a frustoconical transition section to the riser section 132 of the first zone 120. Often, the riser section 132 defines a tube, which is preferably cylindrical, and extends upwardly from the first zone 120. The mixture of catalyst and gas may travel at a higher superficial gas velocity than the first zone 120. The increased gas velocity may be due to the reduced cross-sectional area of the riser section 132 relative to the cross-sectional area of the first zone 120 below the transition section. Hence, the superficial gas velocity may usually exceed about 2.2 m/s. The riser section 132 may have a lower catalyst density of less than about 80 kg/m$^3$.

Generally, the mixture of catalyst particles and flue gas is discharged from an upper portion of the riser section 132 into the second zone 160. Substantially completely regenerated catalyst may exit the top of the transport, riser section 132, but arrangements in which partially regenerated catalyst exiting from the first zone 120 are also contemplated. Discharge may be effected through one or more arms 182 that can separate a majority of the regenerated catalyst from the flue gas. In one exemplary embodiment, the catalyst and gas flowing up the riser section 132 can impact a top elliptical cap of the riser section 132 and reverse flow.

The catalyst and gas then exit through downwardly directed discharge outlets of the one or more disengaging arms 182. Typically, the sudden loss of momentum and downward flow reversal cause a majority of the heavier catalyst to fall to a dense catalyst bed and the lighter flue gas and a minor portion of the catalyst still entrained therein to ascend upwardly in the second zone 160. One or more cyclones 190, which in this exemplary embodiment is four cyclones, can further separate catalyst from ascending gas and may deposit catalyst through dip legs into a dense catalyst bed. Generally, flue gas exits the cyclones 190, collects in a plenum 194, and exits as a flue gas stream 198. Optionally, the flue gas stream 198 may be sent to a flue gas or power recovery system before discharge. Catalyst densities in the dense catalyst bed may be typically kept within a range of about 640-about 960 kg/m³. A fluidizing conduit may deliver fluidization gas stream 184, typically air, to the dense catalyst bed through a fluidization distributor 186. In a combustor-style regenerator, approximately no more than about 2% of the total gas requirements within the process enter the dense catalyst bed through the fluidization distributor 186. In this exemplary embodiment, gas is added here not for combustion purposes but only for fluidizing purposes, so the catalyst will fluidly exit through the catalyst recycle conduit 134 and the regenerator standpipe 80. The fluidization gas stream 184 added through the fluidization distributor 186 may be combustion gas. In the case where partial combustion may be effected in the first zone 120, greater amounts of combustion gas stream 184 can be fed to the second zone 160 through the fluidization distributor 186.

From about 10-about 30%, by weight, of the catalyst discharged from the first zone 120 may be present in the gases above the riser section 132 and enter the one or more cyclones 190. The regenerator 110 may typically require about 14 kilograms of air per kilogram of coke removed to obtain complete regeneration. When more catalyst is regenerated, greater amounts of feed may be processed. Typically, the regenerator 110 has a temperature of about 590-about 740° C. in the first zone 120, and about 640-about 760° C. in the second zone 160. The regenerator standpipe 80 may be in downstream communication with the regenerator 110 and can communicate with the riser 280. Regenerated catalyst from a dense catalyst bed may be transported through regenerator standpipe 80 as a stream of catalyst from the regenerator 110 back to the riser-reactor 200 through a control valve where it again contacts feed as the FCC process continues.

Figure 2:
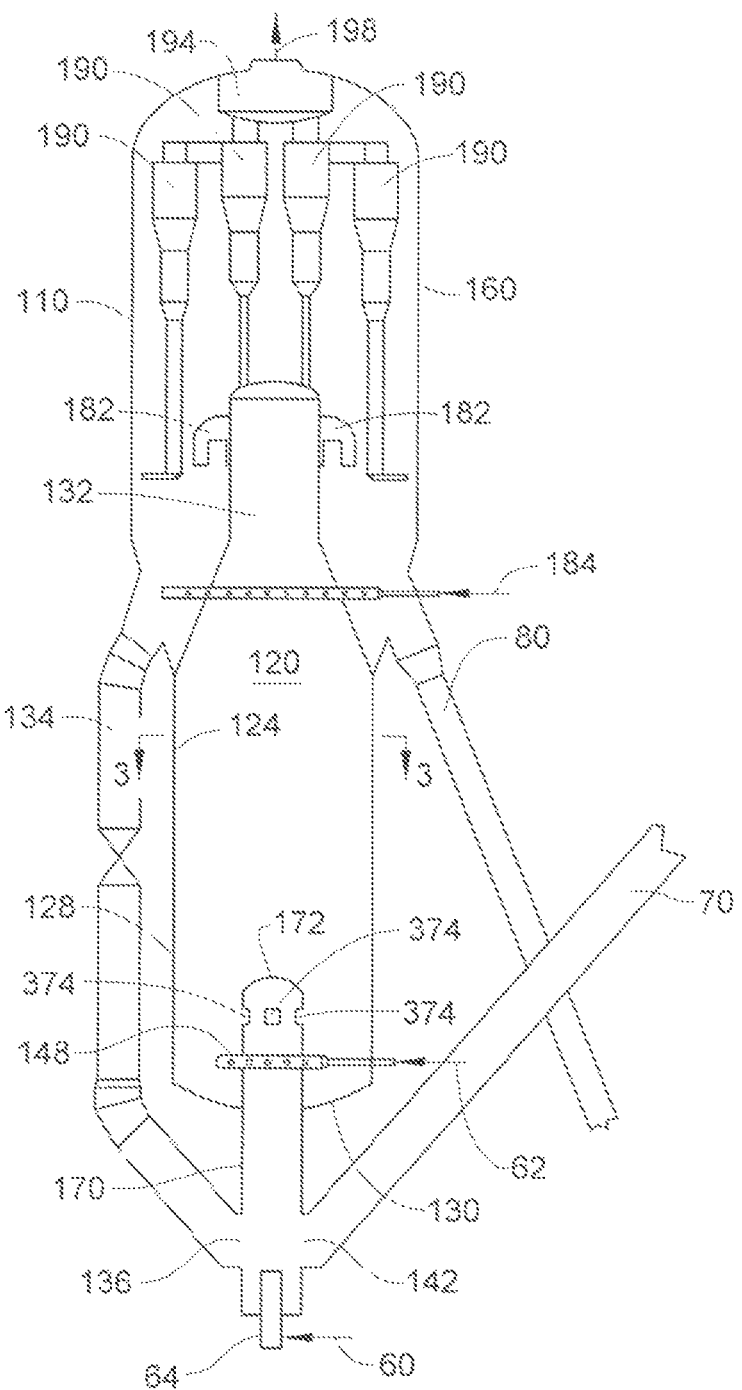
FIG. 2 is a schematic, elevational view of an exemplary regenerator.

FIG. 2 illustrates a further embodiment of FIG. 1 with a different configuration for the first zone 120 of the regenerator 110. Elements of the regenerator in FIG. 2 with the same elements as in FIG. 1 may have the same respective reference numerals as in FIG. 1, even if the elements are depicted with different shapes.

Referring to FIG. 2, an alternative embodiment may provide the first stream 136 of catalyst from the catalyst recycle conduit 134 and the second stream 142 of catalyst from the spent catalyst conduit 70 directly into the chamber 170. Alternatively, the first stream 136 can be provided to the first zone 120 instead of the chamber 170, the second stream 142 can be provided to the first zone 120 instead of the chamber 170, or the second stream 142 can be provided to the catalyst recycle conduit 134 and a combined stream provided to the chamber 170. In this exemplary embodiment, the chamber 170 has a greater length with a portion extending below the bottom 130 of the regenerator 110. The chamber 170 is in downstream communication with the spent catalyst conduit 70 and catalyst recycle conduit 134. The first stream 136 of regenerated catalyst and the second stream of 142 spent catalyst may be fed to the chamber 170 below the first zone 120.

Fluidization gas from the distributor 64 may fluidize catalyst below entry of the catalyst into the chamber 170. Typically, fluidization gas from the distributor 64 in the chamber 170 fluidizes and lifts the combined catalyst in the chamber 170.

Usually, the catalyst recycle conduit 134 and the spend catalyst conduit 70 are in upstream communication with the first zone 120. The catalyst recycle conduit 134 may communicate the second zone 160 to the first zone 120 via the chamber 170. The chamber 170 may be spaced apart from the at least one wall 124 of the regenerator 110. Optionally, the chamber 170 is radially centered in the first zone 120 as defined by the at least one wall 124 and the bottom 130.

Often, the chamber 170 and at least a portion of the first zone 120 defined by the at least one wall 124 may be cylindrical. The chamber 170 may define an annular space between a portion of the chamber 170 and at least one wall 124 of the first zone 120.

Referring FIGS. 2 and 3a, the combined catalyst may be passed from the chamber 170 having at least one opening or exit 374. In this exemplary embodiment, the chamber 170 has four openings or exits 374, with three of the openings or exits 374 indicated by numerals in FIG. 2 and two of the openings or exits 374 indicated by the numerals in FIG. 3a. The openings or exits 374 may be spaced apart from the at least one wall 124 of the regenerator 110. The respective exits or openings 374 may be in the vertical wall of the chamber 170.

Generally, the combined catalyst may pass through the chamber 170 upward to the openings 374. Usually, the catalyst exiting the openings 374 is propelled by fluidization gas from the distributor 64. Generally, the cap 172 of the chamber 170 prevents the catalyst from exiting the chamber 170 upward in alignment with the riser section 132.

Generally, the combined catalyst may pass out of the chamber 170 and a distributor 148, often ring-shaped, can receive a fluidization gas stream 62. The fluidization gas stream 62 can be an oxygen-containing gas, such as air. Typically, the mixed catalyst passes upward with the aid of the fluidization gas stream 62 via the distributor 148 into the riser section 132, and proceeds as discussed above.

Referring to FIG. 3b, an alternate version of a top for the chamber 170 depicts four openings 474 (two being numbered) in an inlet end of a respective stub tube 472 that may have a rectangular or other cross-sectional shape. Each respective stub tube 472 may also have an opening 478 (two being numbered) in a respective outlet end. The distributor 148 and fluidization gas stream are omitted to unclutter the drawing. Each stub tube 472 can have an opening 474 on an outlet end that provides communication between an interior of the chamber 170 and the first zone 120. The catalyst may proceed upward, be regenerated, and be provided to the riser-reactor 200, as discussed above.

Referring to FIG. 3c, a further version of a top for the chamber 170 can have each opening or inlet 574 that may be an inlet of a respective swirl tube 572 having a rectangular cross-section. The distributor 148 and fluidization gas stream are omitted to unclutter the drawing. This version has four openings or inlets 574 and swirl tubes 572, with two for each numbered. Each swirl tube 572 can have a respective opening or outlet 578 (two of which are numbered) that may provide communication between an interior of the chamber 170 and the first zone 120. The swirl-imparting configuration may be an arcuate tube. As the combined catalyst can pass from the chamber 170 into the swirl arm 124, the arcuate configuration may impart a swirling motion to the catalyst as well as the gas provided by the distributor 64, typically as the catalyst passes from the openings 578 of the chamber 170. The swirling motion can serve to increase mixing of catalyst from the first stream 136 with catalyst from the second stream 142. The chamber 170 may have at least two swirl tubes 572, preferably four swirl tubes 572, each with respective exit openings 578. The catalyst may proceed upward to the riser section 132, and be regenerated and returned to the riser-reactor 200, as discussed above. Although the versions of the chamber 170 as depicted in FIGS. 3a-c are discussed in conjunction with the regenerator 110 of FIG. 2, it should be understood that these designs of the chamber 170 may also be used with other regenerators, including the regenerator 110 depicted in FIG. 1.

Referring to FIG. 4, a partial, schematic depiction of an alternative embodiment of the bottom portion of the regenerator 110 is provided. In this embodiment, the first stream 136 of catalyst from the catalyst recycle conduit 134 is fed into the chamber 170 at an inlet of the catalyst recycle conduit 134 to the chamber 170. Generally, the chamber 170 is in downstream communication only with the catalyst recycle conduit 134, not the spent catalyst conduit 70, although in other embodiments the chamber 170 may be in downstream communication with the spent catalyst conduit 70 instead of or in addition to the catalyst recycle conduit 134. In another alternative, the catalyst recycle conduit 134 can communicate with the first zone 120 and the spent catalyst conduit 70 can communicate with the chamber 170. Additionally, the spent catalyst can be provided to the catalyst recycle conduit 134 instead, and both catalysts provided below the first zone 120 in the chamber 170. Elements in FIG. 4 can have the same respective reference numerals as in FIG. 2, even if their shapes are different.

The embodiment of FIG. 4 has generally the same configuration as the embodiment of FIG. 2. The catalyst recycle conduit 134 may provide catalyst to the chamber 170 and the spent catalyst conduit 70 to the first zone 120. Typically, the chamber 170 has a frustoconical wall 612 above the chamber 170 to provide a venturi device. The first stream 136 of recycled, regenerated catalyst propelled upward by the fluidization gas stream 60 from the distributor 64 may be accelerated as the catalyst exits an opening or outlet 616 from the chamber 170 because the opening 616 may be narrowed due to the gradually decreasing inner diameter ascending in the chamber 170. The accelerated first stream 136 of regenerated catalyst provides an eductor effect to improve mixing with the second stream 142 of spent catalyst entrained upward by fluidization gas from the distributor 64 and by the eductor effect of the first stream 136 of regenerated catalyst exiting the opening 616 under acceleration. The mixed stream of catalyst travels upward in the first zone 120. In one aspect, the opening 616 may be at an elevation above a lower most portion, and in other embodiments an upper most portion, of an inlet of the spent catalyst conduit 70. Hence, the first stream 136 of regenerated catalyst may pass upward from the inlet of the catalyst recycle conduit 134 into the chamber 170 to the opening 616. The fluidization gas stream 62 may be provided by the distributor 148, as discussed above, to propel the catalyst upwards to the riser section 132. Afterwards, the catalyst can be regenerated and returned to the riser-reactor 200, as discussed above.

Figure 5:
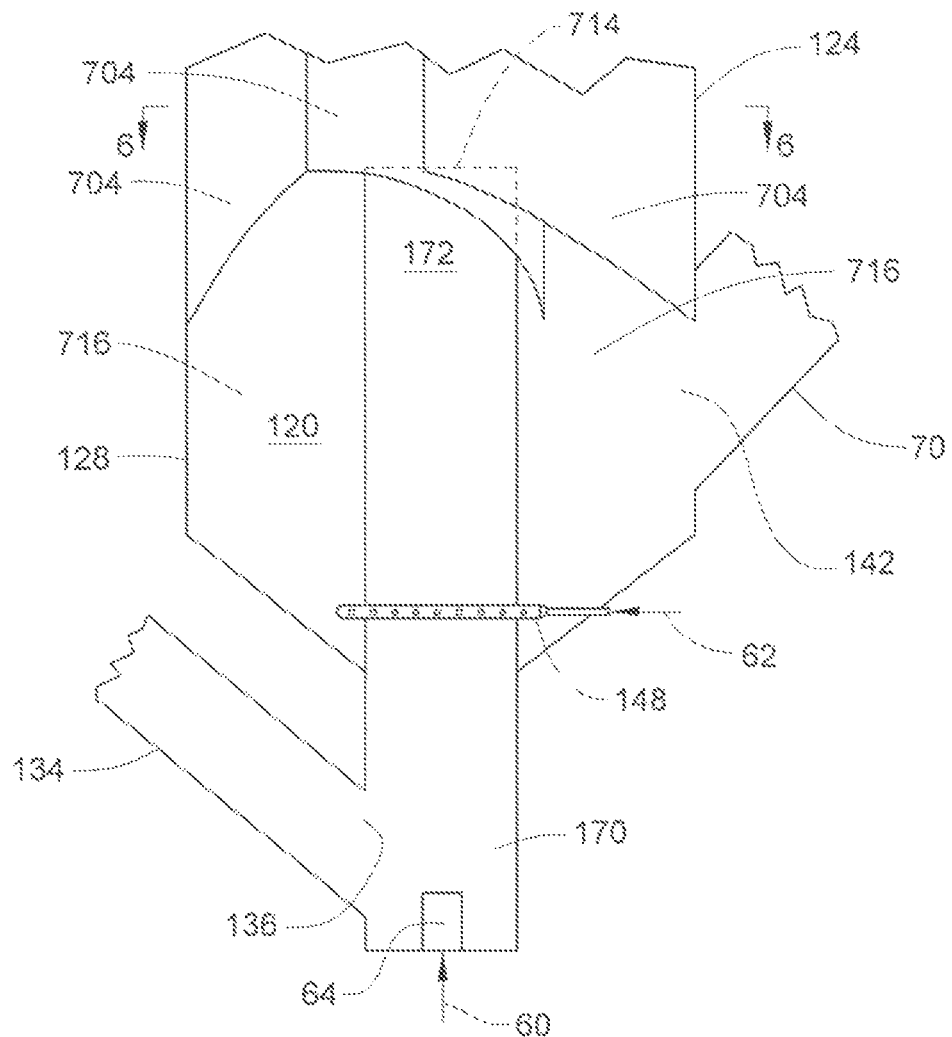
FIG. 5 is a partial, schematic, elevational view of the exemplary regenerator of FIG. 2 incorporating another alternative embodiment.
Figure 6:
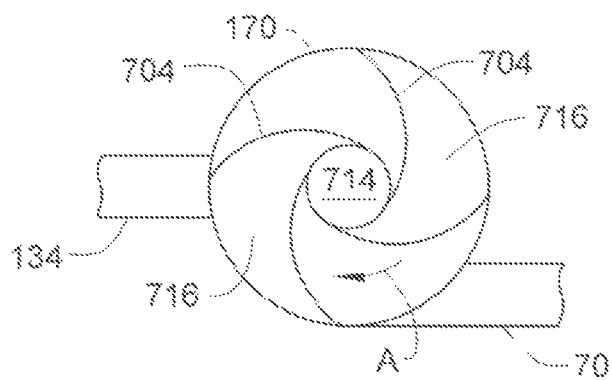
FIG. 6 is a sectional view of FIG. 5 taken at segment 6-6.

Referring to FIGS. 5 and 6, a partial, schematic, elevational view of another alternative embodiment of the regenerator 110, in which the chamber 170 also can have an open top or an opening 714. The distributor 148 and fluidization gas stream are omitted in FIG. 6 to unclutter the drawing. In this embodiment, the first catalyst stream 136 from the catalyst recycle conduit 134 may be fed into the chamber 170, which can be in direct downstream communication only with the catalyst recycle conduit 134, not the spent catalyst conduit 70. In other embodiments, the spent catalyst conduit 70 can communicate with the chamber 170 instead of or in addition to the first zone 120. In another alternative, the catalyst recycle conduit 134 can communicate with the first zone 120 and the spent catalyst conduit 70 can communicate with the chamber 170. Alternatively, the spent catalyst can be provided to the catalyst recycle conduit 134 instead, and both catalysts provided below the first zone 120 in the chamber 170. Elements in FIGS. 5 and 6 can be indicated with the same respective elements in FIG. 2, even if the elements are depicted with different shapes.

Usually, the embodiment of FIGS. 5 and 6 has a generally similar configuration as the embodiment of FIG. 2. The catalyst recycle conduit 134 may provide catalyst to the chamber 170 and the spent catalyst conduit 70 can provide catalyst to a space 716 in the first zone 120. Often, the chamber 170 is fluidized by the fluidization gas stream 60 from the distributor 64, and the first zone 120 is fluidized by the fluidization gas stream 62 from the distributor 148, as discussed above.

Referring to FIG. 6, the spent catalyst conduit 70 may be tangentially arranged with respect to the at least one wall 124 so as to give the spent catalyst an angular component upon entering the first zone 120. Four swirl vanes 704, although any suitable number may be utilized, are arranged with a respective space 716 (with two swirl vanes 704 and two spaces 716 numbered) to further impart angular momentum to the spent catalyst in agreement with the tangential arrangement of the spent catalyst conduit 70. Arrow "A" can show the angular direction in which catalyst is induced to swirl by the swirl vanes 704 and the tangentially connected spent catalyst conduit 70. The catalyst recycle conduit 134 is radially arranged with respect to the chamber 170.

The chamber 170 can have the opening 714 at its top, so catalyst from the first catalyst stream 136 may exit the opening upward in alignment with the chamber 170. The space 716 can include swirl vanes 704 between the at least one wall 124 and the chamber 170 adjacent to the opening 714. The top of the chamber 170 is shown in phantom because it is hidden behind the swirl vanes 704 that may extend above the opening 714 at the top of the chamber 170. A plurality of swirl vanes 704 may be installed, each having a helical configuration, to impart angular momentum to catalyst exiting therethrough. As the second stream 142 of spent catalyst may ascend from the space 716 above the chamber 170, then may be pushed upward therethrough by fluidization gas from the distributor 148, the swirl vanes 704 can impart further angular momentum to the spent catalyst. The spent catalyst may flow through the vanes at a velocity in the range of about 1-about 10 m/s, and flux in range of about 240-about 1,500 kg/m$^2$/s. Typically, the high flux, swirling spent catalyst mixes with the regenerated catalyst exiting the chamber 170 through the opening 714 propelled by fluidization gas from the distributor 64. The opening 714 may be at any suitable elevation with respect to the spent catalyst conduit 70. Hence, the first stream 136 of spent catalyst may pass upwardly from the catalyst recycle conduit 134 into the chamber 170 to the opening 714. Afterwards, the mixed catalyst may pass upwards to the riser section 132 of the regenerator 110, propelled at least, in part, by the fluidization gas from the distributor 148. Next, the catalyst may be regenerated and returned to the riser-reactor 200, as discussed above.

Figure 7:
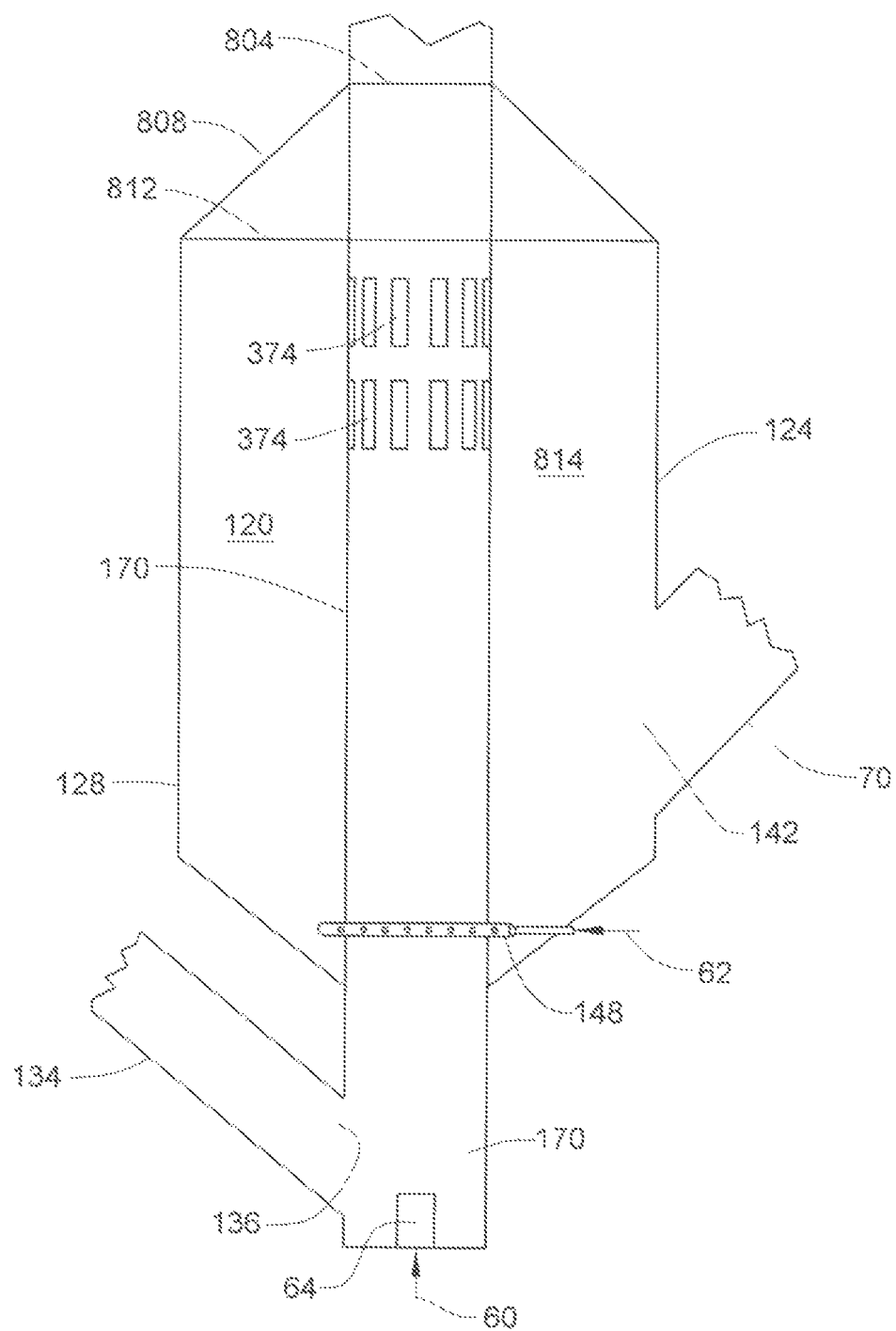
FIG. 7 is a partial, schematic, elevational view of the exemplary regenerator of FIG. 2 incorporating yet another embodiment.

Referring to FIG. 7, the elements in FIG. 7 that are the same in FIG. 2 may be numbered the same, even if their shapes are depicted differently. The embodiment of FIG. 7 can have a similar configuration as the embodiment of FIG. 2. The catalyst recycle conduit 134 may provide catalyst to a chamber 170, and the spent catalyst conduit 70 can provide catalyst to the first zone 120. In other embodiments, the spent catalyst conduit 70 can communicate with the chamber 170 instead of or in addition to the first zone 120. In another alternative, the catalyst recycle conduit 134 can communicate with the first zone 120 and the spent catalyst conduit 70 can communicate with the chamber 170. Alternatively, the spent catalyst can be provided to the catalyst recycle conduit 134 instead, and both catalysts provided below the first zone 120 in the chamber 170.

The first stream 136 of catalyst from the catalyst recycle conduit 134 can be provided into the chamber 170 that may be in direct downstream communication only with the catalyst recycle conduit 134. The chamber 170 may extend upward through a base 128. However, a baffle 812 may prevent catalyst from ascending in the space 814 adjacent to the frusto-conical transition section 808. Openings 374 (two of which are numbered) formed in the chamber 170 can allow the second stream 142 of spent catalyst to enter into the chamber 170. Consequently, the chamber 170 may be in downstream communication with the spent catalyst conduit 70. The spent catalyst conduit 70 can provide the second stream 142 of catalyst to the space 814. The second stream 142 of catalyst may pass along the chamber 170 until the catalyst may pass from the space 814 through openings 374 into the chamber 170 impelled by a fluidization gas from the distributor 148. The second stream 142 of catalyst may enter the chamber 170 through the openings 374 at a velocity in the range of about 1-about 10 m/s and flux in a range of about 240-about 1,500 kg/m$^2$/s. The first stream 136 of recycled, regenerated catalyst can mix with the second stream 142 of spent catalyst in the chamber 170. Generally, the mixed stream of catalyst may exit the opening 804 in the chamber 170 and enter the riser section 132. In another aspect, the openings 374 may be at any suitable elevation, particularly with respect to the spent catalyst conduit 70. Afterwards, the catalyst may be regenerated and returned to the riser-reactor 200, as discussed above.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for mixing catalyst in a regenerator, comprising:
   A) providing a first stream of catalyst;
   B) providing a second stream of catalyst mixed with the first stream of catalyst; and
   C) providing an oxygen-containing gas to a chamber via a distributor of the regenerator wherein the chamber imparts a swirl to at least one of the oxygen-containing gas, the first catalyst, and the second catalyst for regenerating the catalyst.

2. The process according to claim 1, wherein the first stream of catalyst comprises recycled catalyst and the second stream of catalyst comprises spent catalyst.

3. The process according to claim 1, wherein the second stream is provided downstream of the first stream.

4. The process according to claim 1, wherein the first and second streams are provided directly into the chamber.

5. The process according to claim 3, wherein the first stream is provided inside the chamber.

6. The process according to claim 4, further comprising providing the distributor at the base of the chamber.

7. The process according to claim 1, wherein the first and second streams are provided proximate and outside the chamber.

8. The process according to claim 7, wherein the chamber forms one or more swirl arms for imparting the swirl.

9. The process according to claim 7, wherein the chamber forms one or more swirl vanes for imparting the swirl.

10. A process for mixing catalyst in a regenerator, comprising:
    A) providing at least one wall and a chamber spaced apart from the at least one wall;
    B) providing a first stream of catalyst into the chamber;
    C) providing a second stream of catalyst outside the chamber downstream of the first stream; and
    D) providing an oxygen-containing gas to the chamber via a distributor.

11. The process according to claim 10, wherein the first stream of catalyst comprises spent catalyst and the second stream of catalyst comprises recycled catalyst.

12. The process according to claim 11, wherein the regenerator comprises a first zone and a second zone, and the recycled catalyst is obtained from the second zone.

13. The process according to claim 12, wherein the second zone comprises one or more cyclones.

14. The process according to claim 10, wherein the oxygen-containing gas comprises air.

15. The process according to claim 10, wherein the chamber forms a cap, which in turn comprises one or more swirl arms for imparting a swirl to the oxygen-containing gas.

* * * * *